UNITED STATES PATENT OFFICE.

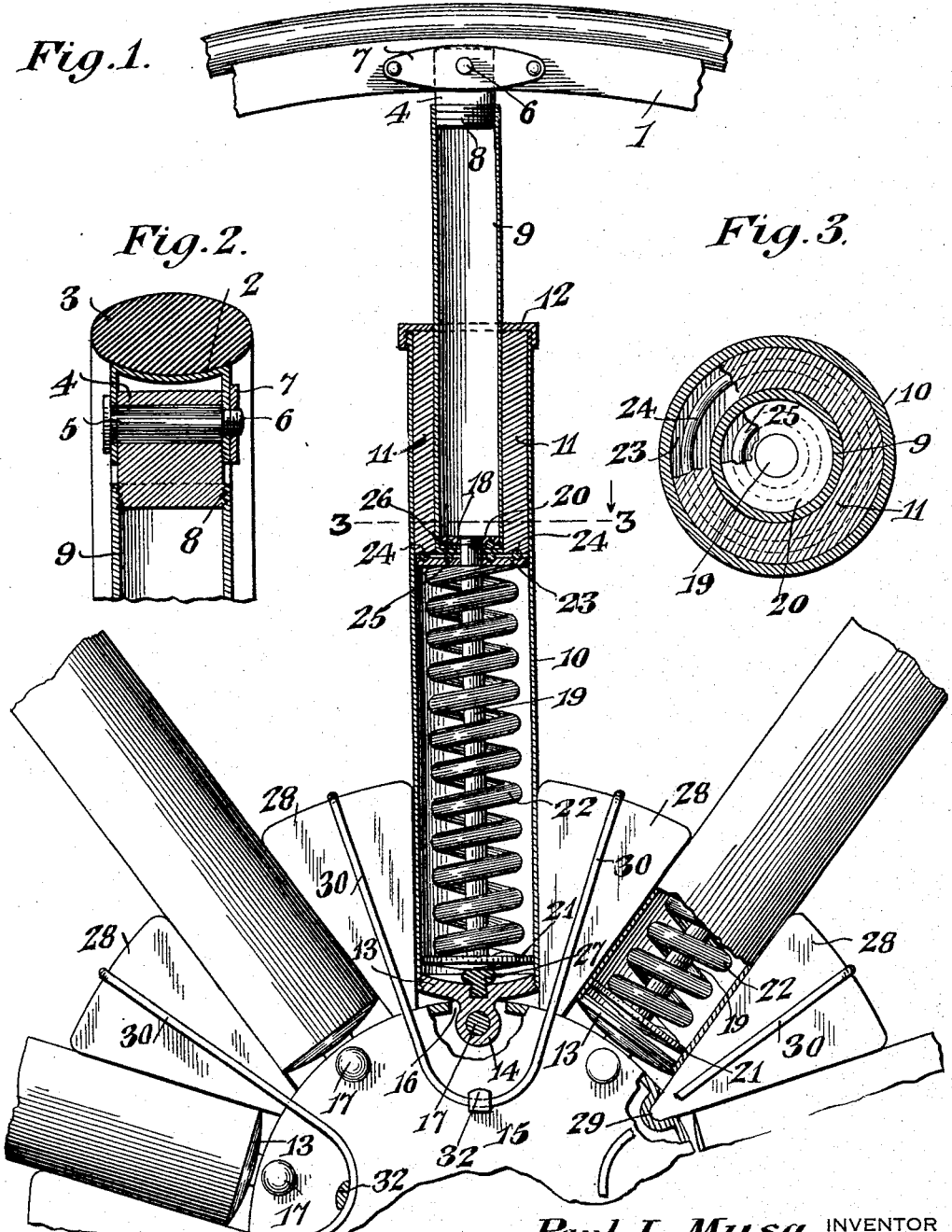

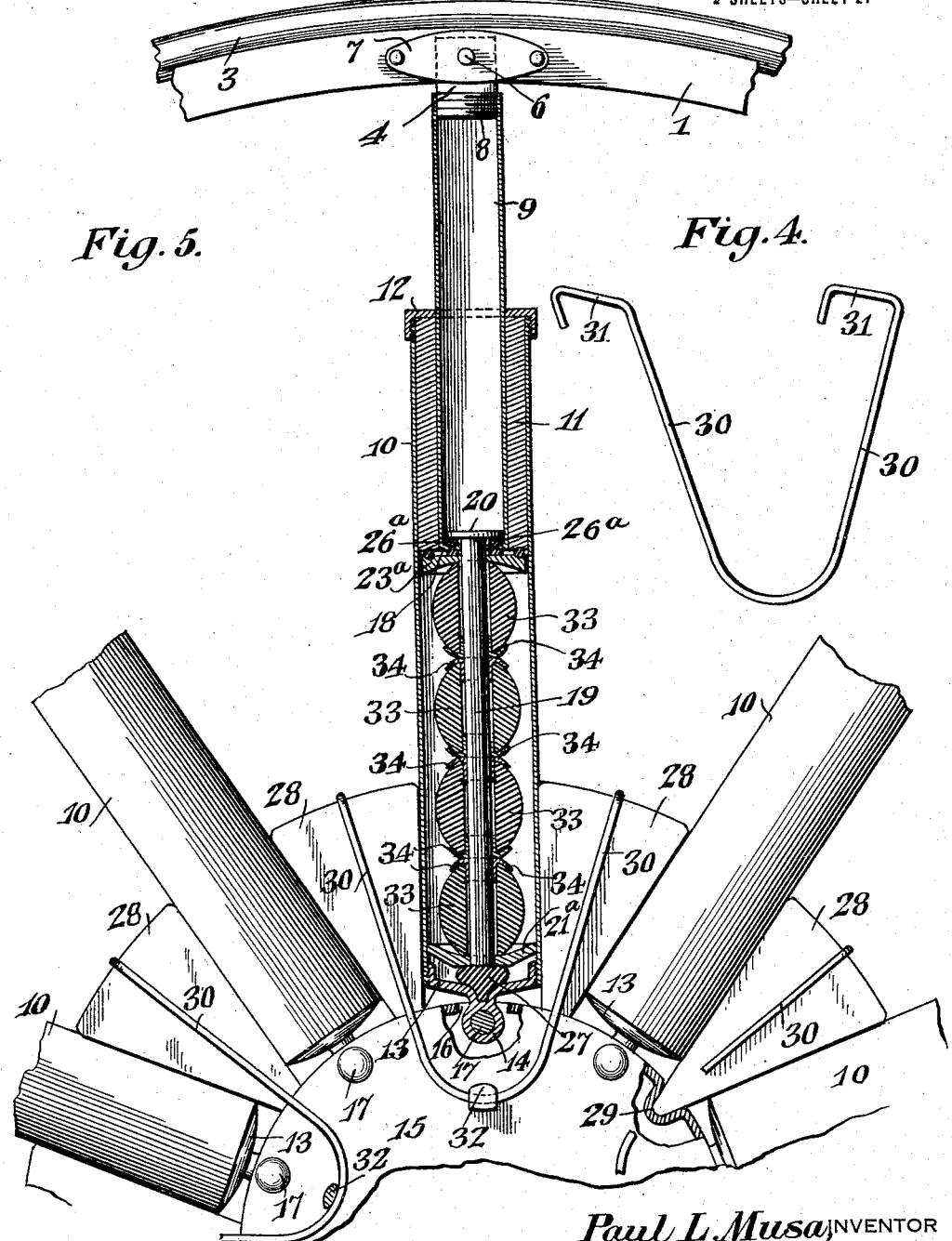

PAUL LEO MUSA, OF WENATCHEE, WASHINGTON.

RESILIENT WHEEL.

1,177,435.   Specification of Letters Patent.   Patented Mar. 28, 1916.

Application filed May 19, 1915. Serial No. 29,189.

*To all whom it may concern:*

Be it known that I, PAUL L. MUSA, a citizen of the United States, residing at Wenatchee, in the county of Chelan and State of Washington, have invented a new and useful Resilient Wheel, of which the following is a specification.

This invention has reference to resilient wheels and is designed to provide a resilient wheel which will readily yield to obstructions in its path and which at the same time may be employed as a driving wheel.

In accordance with the present invention there is provided a rim designed to carry any suitable kind of a tire, whether rubber or metal, and this rim is connected to a hub by spokes, which latter comprise two telescoping members each of which is hollow, and both have pistons within them connected together by a rod which in turn is surrounded by a spring contained within the larger one of the hollow spoke members. The spokes are connected at the respective ends to the rim and hub by pivot connections and between the spokes at the hub ends elastic blocks are inserted, so that while the spokes may yield for certain purposes they are sufficiently resistant because of the presence of the elastic blocks to admit of the application of a driving force to the axle without producing undue distortion of the wheel.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation of a portion of a wheel constructed in accordance with the present invention with some parts broken away and some parts shown in longitudinal section. Fig. 2 is a section of the rim end of a spoke and also of the rim and tire in a plane at right angles to the showing of Fig. 1, the drawing being on a larger scale than Fig. 1. Fig. 3 is a section on the line 3—3 of Fig. 1, with more distant parts broken away to show parts not otherwise visible in the section, and more distant parts being omitted. Fig. 4 is a perspective view of a yoke clip for holding the elastic filling blocks between the hub ends of the spokes in place. Fig. 5 is a view similar to that of Fig. 1 but showing a modified form of the invention.

Referring to the drawings there is shown a channel-shaped rim 1 which may be and preferably is of channel metal in ring form. The outer surface of the rim 1 may be concave, as shown at 2, to receive and hold a tire 3, but the present invention is not directed to the tire construction, and hence it will be understood that any suitable form of tire and suitable form of rim may be employed.

At proper intervals about the rim, blocks 4 are secured by pivot bolts 5, which latter may be threaded at one end, as shown at 6, and the rim 1 may be there provided with reinforcing plates 7 to accommodate the threaded end 6.

Each block 4 is threaded, as shown at 8, at the end remote from the pivot bolt 5 and there receives one end of a tube 9 constituting one member of a spoke. It will be understood that there are as many blocks 4 and spoke members 9 as are needed in the construction of the wheel, and these spoke sections are distributed about the rim usually in equi-spaced relation. There is also another spoke member 10 which may be of considerably larger diameter than the spoke member 9, and the latter telescopes into the member 10. Because of the difference in diameters of the members 9 and 10 and for other reasons, that end of the member 10 into which the member 9 telescopes, is provided with an elongated bushing or tubular filler 11, and that end of the spoke member 10 entered by the member 9 has a ring-shaped cap 12 covering the outer end of the bushing 11 and traversed by the member 9.

That end of the spoke member 10 remote from the end entered by the member 9 is closed by a head 13 which may be screwed thereinto, and this head is formed into a projecting eye 14 entering a hub 15 through a peripheral passage 16 therein. The eye 14 is traversed by a pivot pin 17 connecting the hub end of the spoke made up of the members 9 and 10 to the hub, but allowing oscillation of the spoke about the pivot 17, which latter extends parallel with the axis of rotation of the wheel. The pivot 5 is in similar relation to the axis of rotation of the wheel.

That end of the spoke section 9 remote from the rim is contracted to form a head 18 centrally traversed by a rod 19. Connected to that end of the rod 19 within the spoke section 9 is a head or piston 20 which may be of sufficient diameter to move quite snugly and yet freely lengthwise of the spoke section 9. The other end of the rod 19 carries a piston or head 21 of a diameter to snugly yet freely move lengthwise of the spoke section 10 within the latter.

The rod 19 is surrounded by a helical spring 22 which at one end bears against the head or piston 21 and at the other end against a plate 23 of a diameter approximating the inner diameter of the spoke section 10. Interposed between the plate 23 and the bushing 11 is a ring 24 and the corresponding portions of both the bushing and the plate may be grooved to partially seat the ring 24. Another ring 25 is in part seated in the plate 23 and in position to engage against the head 18 of the spoke section 9. The piston or head 20 carries a ring 26 in position to engage the inner wall of the head 18 of the spoke section 9. These rings 24, 25 and 26 may be of some relatively soft material, like rubber, to serve both as packing rings and as buffers.

The head 13 is provided on its inner face at about its middle portion with a buffer block 27 designed to be engaged by the head 21 to thereby prevent noise of contact.

Lodged between the hub ends of the spokes are segmental blocks 28 preferably of rubber or rubber composition, since it is desirable that these blocks be more or less elastic or yielding. The blocks at their smaller ends are seated in recesses 29 appropriately formed in the peripheral portion of the hub 15, and the blocks are held in place by yoke-shaped clips 30 which may be made of wire or other suitable metal with the free ends of the legs bent to form hooks 31 engaging over the wider ends of the blocks 28. The yoke end of each clip 30 engages under a hook-shaped lug 32 on the appropriate side face of the hub 15. Since each yoke 30 holds two blocks 28 in place, there are but half as many yokes as blocks, and, of course, there are only half as many hook lugs 32 as blocks.

The structure shown in Fig. 5 is in most respects similar to that of Fig. 1, and where the parts are substantially alike the same reference numerals are applied. The principal difference between the structure of Fig. 1 and Fig. 5 is that instead of a helical spring 22, the rod 19 has a spring thereon in the form of rubber blocks 33 strung on the rod, each block being provided with a protecting cap 34 at the end meeting the next adjacent block and its cap. In place of the head or piston 21 of Fig. 1 the structure of Fig. 5 has a cupped or dished head 21ª which, however, performs a like function to the head 21. Instead of the plate 23 of Fig. 1 there is a plate 23ª having the face engaged by the adjacent ball 33 dished to accommodate such ball. Instead of the rings 25 and 26 the head 18 of the spoke member 9 carries elastic studs 26ª forming buffers for both the piston 20 and the plate 23ª.

Suppose that a wheel constructed as described and traveling along the roadway meets an obstruction over which the wheel is capable of riding. If it be assumed that that portion of the rim 1 and tire 3 shown in Fig. 1 be in contact with the roadway instead of at the top of the wheel, as indicated in the figure, the obstruction will tend to move the rim 1 toward the axle by causing the spoke section 9 to telescope to a greater extent into the spoke section 10. The springs 22 are assumed to be under appropriate tension to support the weight of the vehicle, and hence exert considerable pressure upon the head 13 and plate 23 holding the parts of the spoke in the position shown in Fig. 1. The telescoping movement of the spoke section 9 into the spoke section 10 causes additional pressure to be exerted upon the plate 23 forcing the latter to compress the spring 22, but as the rod 19 is a rigid rod the head or piston 20 does not participate in this movement, but has a relative movement into the spoke section 9, much after the manner of a pump piston. The elevation of the rod engaging portion of the rim is participated in by the whole rim so that if the then uppermost spoke be considered, the spoke section 9 moves out of the spoke section 10 and the normal engagement of the piston 20 with the head 18 causes a movement of the rod 19 with the spoke section 9. This movement causes a like movement of the head 21, thereby compressing the spring 22. The head 21 if fitting the spoke section 10 in a sufficiently snug manner compresses the air within the spoke section 10 after the manner of a pump. While these actions are taking place those spokes which are at the time horizontal or approximately so participate in the movements of the rim 1 by rocking upon the pivots 17, the elastic filler blocks 28 yielding correspondingly. When the obstruction has been passed, the springs 22 cause a return of the parts to the normal position of equilibrium.

By the present invention there is produced a wheel of marked elasticity without of necessity unduly increasing the weight of the wheel. The springs 22 are assisted by air pressure caused within the tubular spoke sections 9 and 10 when the springs 22 yield, and this whether the spokes are contracted or normal. Moreover, the blocks 28, though yieldable to movements of the rim to permit those spokes which happen to be in the horizontal position to rock in participation with the rim movements, afford sufficient resistance to twisting movements of the hub to allow the use of the wheel as a drive wheel. Thus while the wheel is in motion, it will absorb the shock and abnormalities caused by passing over obstructions or from undue sudden pressure bearing on the axle, through the "contracting movement" of the springs which follows each half revolution of the wheel with a constant equal distribution of weight, shock, tension and resiliency throughout the entire wheel.

To aid in excluding dust or dirt an elastic tube may be slipped over the piston end of each spoke with one end of the tube clamped to the rim and the other end to the large cylinder.

What is claimed is:—

1. A resilient wheel provided with a rim, a hub and spokes, the latter each comprising telescoping hollow members, a rod extending axially of the spoke members and provided with a piston at each end fixed thereto, one piston being located in one spoke member and the other piston in the other spoke member, and each piston being of a diameter substantially that of the interior diameter of the member containing it to move snugly yet freely therein, and a spring within one of the members surrounding the rod and normally holding the pistons at similar ends of the hollow members.

2. A resilient wheel provided with a rim, a hub and telescoping spokes connecting the rim and hub, each spoke comprising tubular members in telescoping relation, a rod extending axially of the tubular members with a piston at one end in normal engagement with that end of the larger spoke member remote from the smaller spoke member and at the other end provided with a piston within the smaller spoke member, said pistons being each of a diameter substantially that of the interior diameter of the member containing it, so as to move snugly, yet freely therein, a plate within the larger spoke member adjacent to and within the range of movement of that end of the smaller spoke member entering the larger member, and a spring surrounding the rod with one end in engagement with the first-named piston and the other end in engagement with the plate.

3. A resilient wheel provided with a rim, a hub and telescoping spokes connecting the rim and hub, each spoke comprising tubular members in telescoping relation, a rod extending axially of the tubular members with a piston at one end in normal engagement with that end of the larger spoke member remote from the smaller spoke member and at the other end provided with a piston within the smaller spoke member, a plate within the larger member adjacent to and within the range of movement of that end of the smaller spoke member entering the larger member, a spring surrounding the rod with one end in engagement with the piston on the rod, and the other end in engagement with the plate, and elastic buffers between the plate and that portion of the larger member entered by the smaller member, between the smaller spoke member and said plate, and between the piston within the smaller member and the corresponding end of said smaller member.

4. A resilient wheel provided with a rim, a hub and spokes each comprising two tubular members in telescoping relation and respectively pivotally connected to the rim and hub, the larger spoke member where entered by the smaller member having a bushing there reducing its internal diameter to substantially the external diameter of the smaller member, a rod extending lengthwise of the larger member with a piston at one end of a diameter substantially that of the interior diameter of the larger member, and with a piston at the other end within and of substantially the internal diameter of the smaller spoke member, a plate within the larger member adjacent to the bushing, and a spring surrounding the rod and bearing at opposite ends against the first-named piston and the plate.

5. A resilient wheel comprising a rim, a hub, spokes connecting the rim and hub and pivotally connected at the respective ends to the rim and hub, segmental elastic filler blocks between the spokes at the hub ends thereof and exterior to the hub, and retaining yokes each having hook-shaped terminal portions spread apart and engaging the larger ends of two filler blocks on opposite sides of a spoke, and the hub being provided with hook projections for retaining the yokes by their yoke ends.

6. A resilient wheel comprising a rim, a hub, spokes connecting and at their respective ends pivoted to the rim and hub and longitudinally elastically yieldable, segmental elastic filler blocks between the hub ends of the spokes and exterior thereto, with the hub having peripheral seats for the small ends of the blocks, and retaining means for the blocks holding them in the seats and between the hub ends of the spokes, said retaining means each engaging two blocks on opposite sides of a spoke.

In testimony that I claim the foregoing as my own, I have hereto affixed my signature in the presence of two witnesses.

PAUL LEO MUSA.

Witnesses:
Edwin S. Gill,
Hugo J. Musa.

Copies of this patent may be obtained for five cents each, by addressing the "Commissioner of Patents, Washington, D. C."